United States Patent
La Rosa et al.

[11] Patent Number: 6,078,611
[45] Date of Patent: Jun. 20, 2000

[54] RAKE RECEIVER AND FINGER MANAGEMENT METHOD FOR SPREAD SPECTRUM COMMUNICATION

[75] Inventors: Christopher P. La Rosa, Lake Zurich; Michael J. Carney, Woodstock; Christopher J. Becker, Palatine; Michael A. Eberhardt, Hanover Park; Colin D. Frank, Chicago; Phillip D. Rasky, Buffalo Grove, all of Ill.

[73] Assignee: Motorola, Inc., Schaumburg, Ill.

[21] Appl. No.: 08/931,149

[22] Filed: Sep. 16, 1997

[51] Int. Cl.[7] .............................. H04B 15/00; H04K 1/00; H04L 27/30
[52] U.S. Cl. ............................................ 375/206; 375/200
[58] Field of Search .................................... 375/200, 206, 375/247, 367; 370/320, 335, 342, 441, 350

[56] References Cited

U.S. PATENT DOCUMENTS

| | | | |
|---|---|---|---|
| 5,109,390 | 4/1992 | Gilhousen et al. | 375/335 |
| 5,490,165 | 2/1996 | Blakeney, II et al. | 375/205 |
| 5,577,022 | 11/1996 | Padovani et al. | 370/332 |
| 5,590,160 | 12/1996 | Ostman | 375/367 |
| 5,621,752 | 4/1997 | Antonio et al. | 375/200 |
| 5,764,687 | 6/1998 | Easton | 375/206 |
| 5,764,688 | 6/1998 | Hulbert | 375/206 |

FOREIGN PATENT DOCUMENTS

0896438A1  2/1999  European Pat. Off. .

*Primary Examiner*—Don N. Vo
*Assistant Examiner*—Phuong Phu
*Attorney, Agent, or Firm*—John G. Rouch

[57] ABSTRACT

A RAKE receiver (112) includes a plurality of fingers (122, 124, 126, 128). Each finger includes a demodulator (402) for demodulating a ray of a multipath signal and a time tracking circuit (404) for controlling the time position of the finger in accordance with time position of the ray. A low delay-spread condition is detected and the positions of two adjacent fingers are controlled to prevent convergence of two or more fingers about a common time position. By maintaining finger timing separation, path diversity is exploited by the RAKE receiver even during the low delay-spread condition to improve receiver performance.

15 Claims, 6 Drawing Sheets

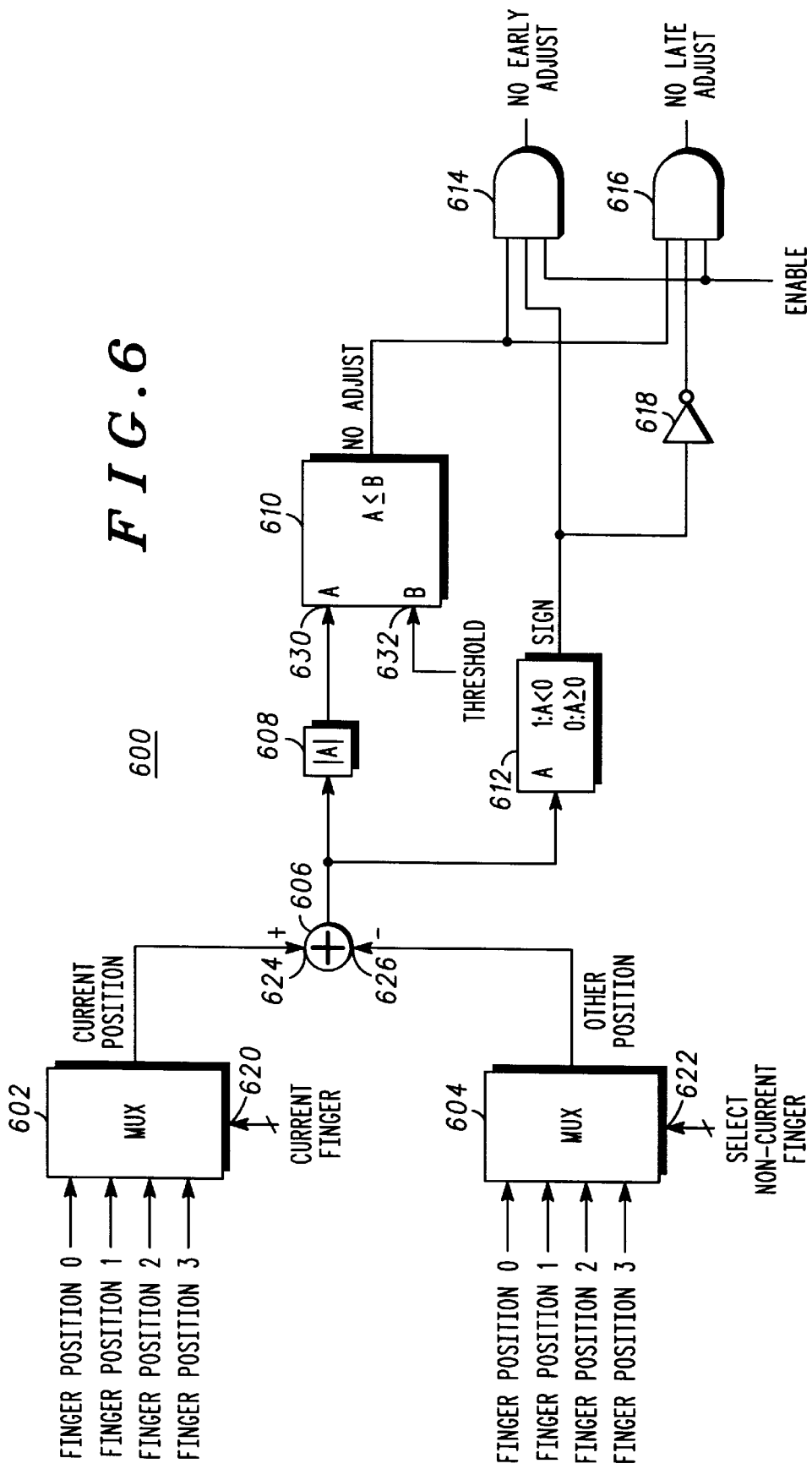

RAKE RECEIVER AND FINGER MANAGEMENT METHOD FOR SPREAD SPECTRUM COMMUNICATION

FIELD OF THE INVENTION

The present invention generally relates to communication systems. More particularly, the present invention relates to a RAKE receiver and method for managing RAKE receiver fingers in a spread spectrum communication system.

BACKGROUND OF THE INVENTION

In a spread spectrum communication system, downlink transmissions from a base station to a mobile station include a pilot channel and a plurality of traffic channels. The pilot channel is decoded by all users. Each traffic channel is intended for decoding by a single user. Therefore, each traffic channel is encoded using a code known by both the base station and mobile station. The pilot channel is encoded using a code known by the base station and all mobile stations. Encoding the pilot and traffic channels spreads the spectrum of transmissions in the system.

One example of a spread spectrum communication system is a cellular radiotelephone system according to Telecommunications Industry Association/Electronic Industry Association (TIA/EIA) Interim Standard IS-95, "Mobile Station-Base Station Compatibility Standard for Dual-Mode Wideband Spread Spectrum Cellular System" ("IS-95"). Individual users in the system use the same frequency but are distinguishable from each other through the use of individual spreading codes. Other spread spectrum systems include radiotelephone systems operating at 1900 MHz, commonly referred to as DCS1900. Other radio and radiotelephone systems use spread spectrum techniques as well.

IS-95 is an example of a direct sequence code division multiple access (DS-CDMA) communication system. In a DS-CDMA system, transmissions are spread by a pseudo-random noise (PN) code. Data is spread by chips, where the chip is the spread spectrum minimal-duration keying element. A key system parameter is the chip duration or chip time. In an IS-95 system, the chip clock rate is 1.2288 Mega-chips per second, equivalent to a chip time of about 0.814 μsec/chip.

Mobile stations for use in spread spectrum communication systems commonly employ RAKE receivers. A RAKE receiver includes two or more receiver fingers which independently receive radio frequency (RF) signals. Each finger estimates channel gain and phase and demodulates the RF signals to produce traffic symbols. The traffic symbols of the receiver fingers are combined in a symbol combiner to produce a received signal.

A RAKE receiver is used in spread spectrum communication systems to combine multipath rays and thereby exploit channel diversity. Multipath rays include line of sight rays received directly from the transmitter and rays reflected from objects and terrain. The multipath rays received at the receiver are separated in time. The time separation or time difference is typically on the order of several chip times. By combining the separate RAKE finger outputs, the RAKE receiver achieves path diversity.

Generally, the RAKE receiver fingers are assigned to the strongest set of multipath rays. That is, the receiver locates local maxima of the received signal. A first finger is assigned to receive the strongest signal, a second finger is assigned to receive the next strongest signal, and so on. As received signal strength changes, due to fading and other causes, the finger assignments are changed. After finger assignment, the time locations of the maxima change slowly, and these locations are tracked by time tracking circuits in each assigned finger. If the multipath rays are separated from each other by at least one chip time of delay, then each path can be resolved separately by the RAKE receiver time tracking circuitry and diversity gain is realized.

On many channels, the multipath rays are separated by intervals of much less than one chip time. Current systems, however, lack the ability to resolve or separate multipath separated by such small intervals, for several reasons. First, if the channel is static and the multipath profile yields only a single local maximum when two closely spaced rays are present, the time tracking circuits of fingers assigned within one chip time of the local maximum will drive those fingers to the time location of the local maximum, and the benefit of channel diversity will be lost. Second, fingers may track to the same time location even if separated by a chip or more. If one path is strong while another path is in a deep fade, the delay-locked loop of the finger assigned to the faded path will detect sidelobe energy of the unfaded path and track to the unfaded path's location. Again, the fingers converge in time and diversity benefits are lost.

Accordingly, there is a need in the art for an improved RAKE receiver and finger management method which can realize the benefits of path diversity when multipath rays are spread by less than one chip time.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

FIG. 6 is a block diagram of a collision prevention circuit for a RAKE receiver;

DETAILED DESCRIPTION OF THE PREFERRED EMBODIMENTS

Figure 1:
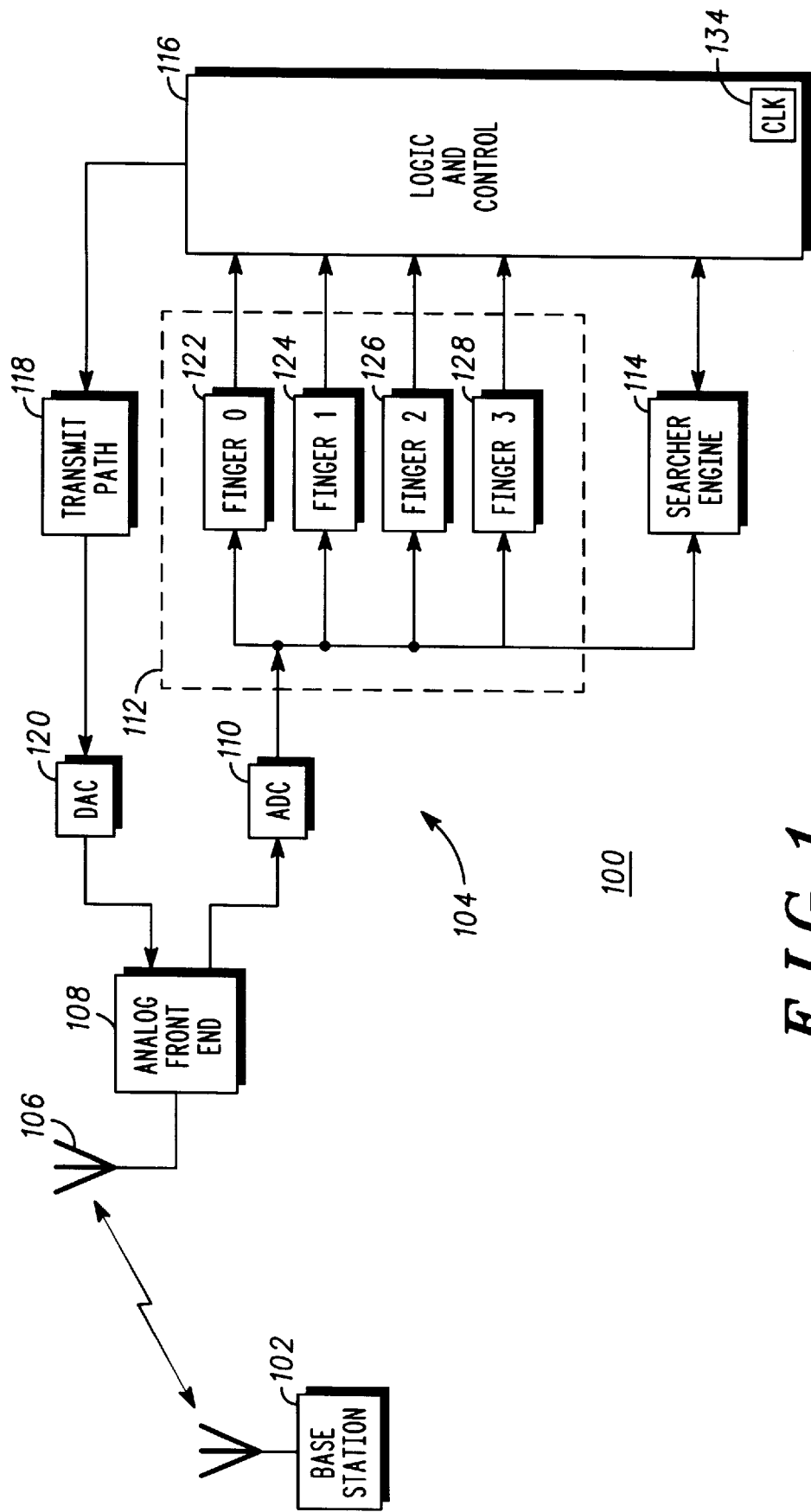
FIG. 1 is a block diagram of a spread spectrum communication system.

Referring now to FIG. 1, a communication system 100 includes a plurality of base stations such as base station 102 configured for radio communication with one or more mobile stations such as radiotelephone 104. The radiotelephone 104 is configured to receive and transmit direct sequence code division multiple access (DS-CDMA) signals to communicate with the plurality of base stations, including base station 102. In the illustrated embodiment, the communication system 100 operates according to TIA/EIA Interim Standard IS-95, "Mobile Station-Base Station Compatibility Standard for Dual-Mode Wideband Spread Spectrum Cellular System," operating at 800 MHz. Alternatively, the communication system 100 could operate in accordance with other DS-CDMA systems including Personal Communication Systems (PCS) at 1800 MHz or with any other suitable spread spectrum or DSCDMA system.

The base station 102 transmits spread spectrum signals to the radiotelephone 104. The symbols on the traffic channel are spread using a Walsh code in a process known as Walsh covering. Each mobile station such as the radiotelephone 104 is assigned a unique Walsh code by the base station 102 so that the traffic channel transmission to each mobile station is orthogonal to traffic channel transmissions to every other mobile station.

In addition to traffic channels, the base station 102 broadcasts a pilot channel, a synchronization channel and a paging channel. The pilot channel is formed using an all-zero sequence that is covered by Walsh code 0, which consists of all zeros. The pilot channel is commonly received by all mobile stations within range and is used by the radiotelephone 104 for identifying the presence of a CDMA system, initial system acquisition, idle mode hand-off, identification of initial and delayed rays of communicating and interfering base stations, and for coherent demodulation of the synchronization, paging, and traffic channels. The synchronization channel is used for synchronizing mobile station timing to base station timing. The paging channel is used for sending paging information from the base station 102 to mobile stations including the radiotelephone 104.

In addition to the Walsh covering, all channels transmitted by the base station are spread using a pseudorandom noise (PN) sequence, also referred to as the pilot sequence. The base station 102 and all base stations in the communication system 100 are uniquely identified by using a unique starting phase, also referred to as a starting time or phase shift, for the pilot channel sequence. The sequences are of length $2^{15}$ chips and are produced at a chip rate of 1.2288 Mega-chips per second and thus repeat every 26⅔ milliseconds. Using this short spreading code, timing of the radiotelephone 104 is synchronized with timing of the base station 102 and the rest of the communication system 100.

The radiotelephone 104 comprises an antenna 106, an analog front end 108, a receive path and a transmit path. The receive path includes an analog to digital converter (ADC) 110, a RAKE receiver 112 and a searcher engine 114, and a controller 116. The transmit path includes a transmission path circuit 118 and a digital to analog converter 120.

The antenna 106 receives RF signals from the base station 102 and from other base stations in the vicinity. Some of the received RF signals are directly transmitted, line of sight rays transmitted by the base station. Other received RF signals are reflected or multipath signals and are delayed in time relative to the directly transmitted rays. The multipath signal includes at least a first ray having first ray timing and a second ray having second ray timing. The first ray timing and the second ray timing vary as a function of time and this variation is tracked by the RAKE receiver 112.

Received RF signals are converted to electrical signals by the antenna 106 and provided to the analog front end 108. The analog front end 108 filters the signals and provides conversion to baseband signals. The analog baseband signals are provided to the ADC 110, which converts them to streams of digital data for further processing.

The RAKE receiver 112 includes a plurality of receiver fingers, including receiver finger 122, receiver finger 124, receiver finger 126 and receiver finger 128. In the illustrated embodiment, the RAKE receiver 112 includes four receiver fingers. However, any suitable number of receiver fingers could be used. Each receiver finger form a receiver circuit assignable to receive one ray of the multipath signal. The receiver fingers include time tracking circuits for controlling the time position of the fingers, also referred to herein as finger timing. Structure and operation of the receiver fingers will be provided in further detail below.

The controller 116 includes a clock 134. The clock 134 controls timing of the radiotelephone 104. For example, the clock generates a chip×8 clock signal at a rate eight times the chip rate of 1.2288 Mega-chips per second. The controller 116 is coupled to other elements of the radiotelephone 104. Such interconnections are not shown in FIG. 1 so as to not unduly complicate the drawing figure.

The searcher engine 114 detects pilot signals received by the radiotelephone 104 from the plurality of base stations including the base station 102. The searcher engine 114 despreads pilot signals using a correlator with PN codes generated in the radiotelephone 104 using local reference timing. As will be described in greater detail below, the searcher engine 114 develops a multipath profile of multipath rays received at the radiotelephone 104. Using the multipath profile, the searcher engine 114 assigns one or more fingers of the RAKE receiver to the multipath rays. For example, the searcher engine 114 assigns first finger 122 to the ray with the strongest received signal strength, the second finger 124 to the ray with the second strongest received signal strength, and so on until all fingers are assigned. Other criteria besides received signal strength may be used as well. Thus, the searcher engine operates as a control circuit which assigns a first receiver circuit such as first finger 122 to receive a first ray of the multipath signal and assigns a second receiver circuit such as second finger 124 to receive a second ray of the multipath signal. After the searcher engine assigns a RAKE receiver finger, the finger independently tracks the timing drift of the assigned ray.

In one embodiment, the present invention provides a method for managing finger assignment in a RAKE receiver. The method includes, at a first finger of the RAKE receiver, receiving a first signal and varying the first finger timing according to the timing variation of the first signal. The method further includes, at a second finger of the RAKE receiver, receiving a second signal and varying the second finger timing according to the timing variation of the second signal. The method still further includes determining a minimum time separation between the first finger timing and the second finger timing and maintaining at least that time separation. The searcher engine detects the low delay-spread condition of the multipath signal and provides control signals to one or more time tracking circuits to prevent convergence of two or more fingers about a common time position.

In a second embodiment, a method for finger management in a RAKE receiver includes the steps of receiving a plurality of signals at the RAKE receiver, assigning each finger of the RAKE receiver to one signal, detecting a low delay-spread condition of the plurality of signals, and, in response, controlling one or more fingers to prevent convergence of two fingers at a common time position. In the illustrated embodiment, the collision prevention circuit within the RAKE receiver detects the low delay-spread condition of the multipath signal and provides control signals to one or more time tracking circuits to prevent convergence of two or more fingers about a common time position. The low delay-spread condition corresponds to timing of two or more RAKE receiver fingers separated by a time interval less than a predetermined threshold. In the illustrated embodiments, the predetermined threshold is one chip time. Other threshold values may also be used, however.

Figure 2:
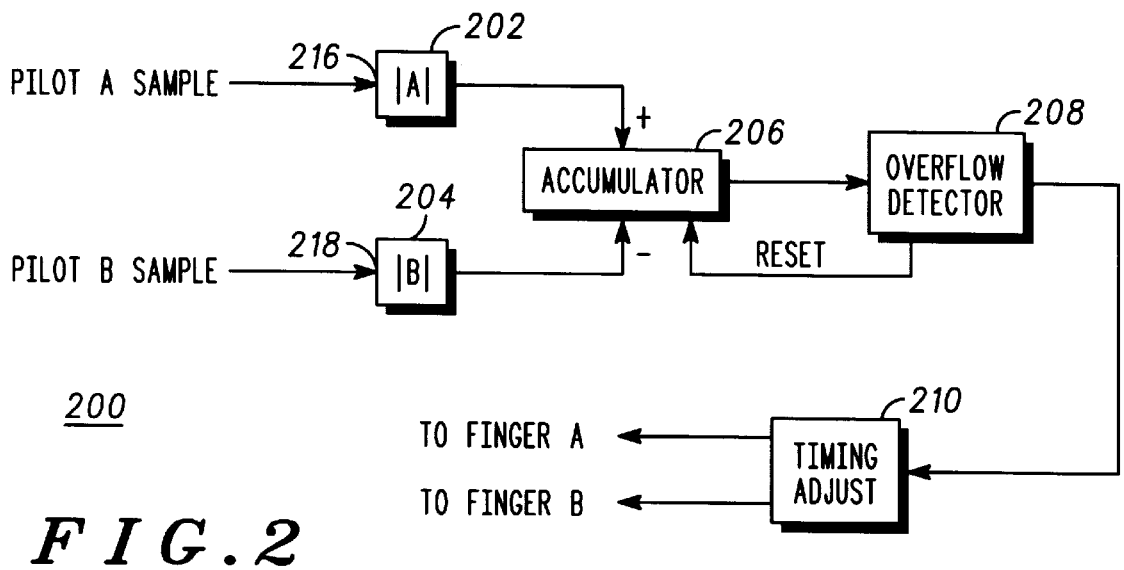
FIG. 2 is a block diagram of a time tracking circuit in accordance with a first embodiment of the present invention.

FIG. 2 is a block diagram of a time tracking circuit 200 in accordance with a first embodiment of the present invention. The time tracking circuit 200 includes a first magnitude circuit 202, a second magnitude circuit 204, an accumulator 206, an overflow detector 208 and a timing adjust circuit 210. Using the time tracking circuit, time separation between a first receiver finger and a second receiver finger is maintained by jointly controlling tracking of the first finger timing and the second finger timing.

The first magnitude circuit 202 has an input 216 configured to receive pilot signal samples from a first finger. The second magnitude circuit 204 similarly has an input 218 configured to receive pilot signal samples from a second finger. The time tracking circuit 200 is preferably time shared among all fingers, requiring control logic to couple the appropriate pilot signal samples to the first magnitude circuit 202 and the second magnitude circuit 204. Alternatively, the necessary circuitry of the time tracking circuit 200 is repeated with appropriate connections to the fingers of the RAKE receiver so that each possible finger combination is combined.

The first magnitude circuit 202 determines the amplitude of the pilot signal sample received from the first finger and the second magnitude circuit 204 determines the amplitude of the pilot signal sample received from the second finger. The respective amplitudes are provided to the accumulator 206 and the amplitude of the second finger pilot signal sample is subtracted from the amplitude of the first finger pilot signal sample. The overflow detector 208 detects an overflow condition in the difference produced by the accumulator 206. When the overflow condition occurs, the overflow detector 208 sends a reset signal to the accumulator 206 and provides an overflow indication to the timing adjust circuit 210. In response to the overflow indication, the timing adjust circuit 210 adjusts the time position of the first finger and the second finger to maintain the time separation of these fingers at least equal to a threshold value.

For example, in the illustrated embodiment, maintaining the time separation at least equal to the threshold value comprises jointly controlling tracking of the first finger timing and second finger timing. This is achievable in various ways. In one example, the two fingers share the same early-late time tracking loop, timing adjust circuit 210. The early-time signal is the de-spread pilot for one finger and the late-time signal is the de-spread pilot for the other finger. By using the early-late time tracking loop in this way, the two fingers will move together (in time) with each timing change. In the second example, the searcher engine provides control signals to a first time tracking circuit of a first finger and a second time tracking circuit of a second finger to maintain the second time tracking circuit a fixed predetermined time difference from the first time tracking circuit while the first time tracking circuit tracks the time position of a first ray.

Thus, in this first embodiment, the multipath profile determined by the searcher engine is used to detect if the multipath is spread over a region from, for example, ¼ chip to 1 chip. The multipath profile contains $E_c/I_o$ (chip energy to nominal interference ratio) energy measurements at ½ chip increments of the short code PN sequence. If a single multipath ray is received, there will be a local maximum in the energy profile corresponding to the position of the ray. The energy measurements in the multipath profile will fall off significantly at +1 chip and −1 chip away from the maximum energy. This signifies a single path, and only one finger will be assigned to the path. However, if there is still significant energy measured at +1 chip or −1 chip away from the local maximum energy, then two fingers are assigned to the region with a fixed separation (for example, ¾ chip) between the fingers.

Once two fingers are assigned to the multipath region, the time tracking circuits of the two fingers are tied together so that both fingers track together and maintain the fixed separation. In accordance with the present invention, control is added to the time tracking operation to prevent the two fingers from drifting together or converging about a common time position.

Figure 3:
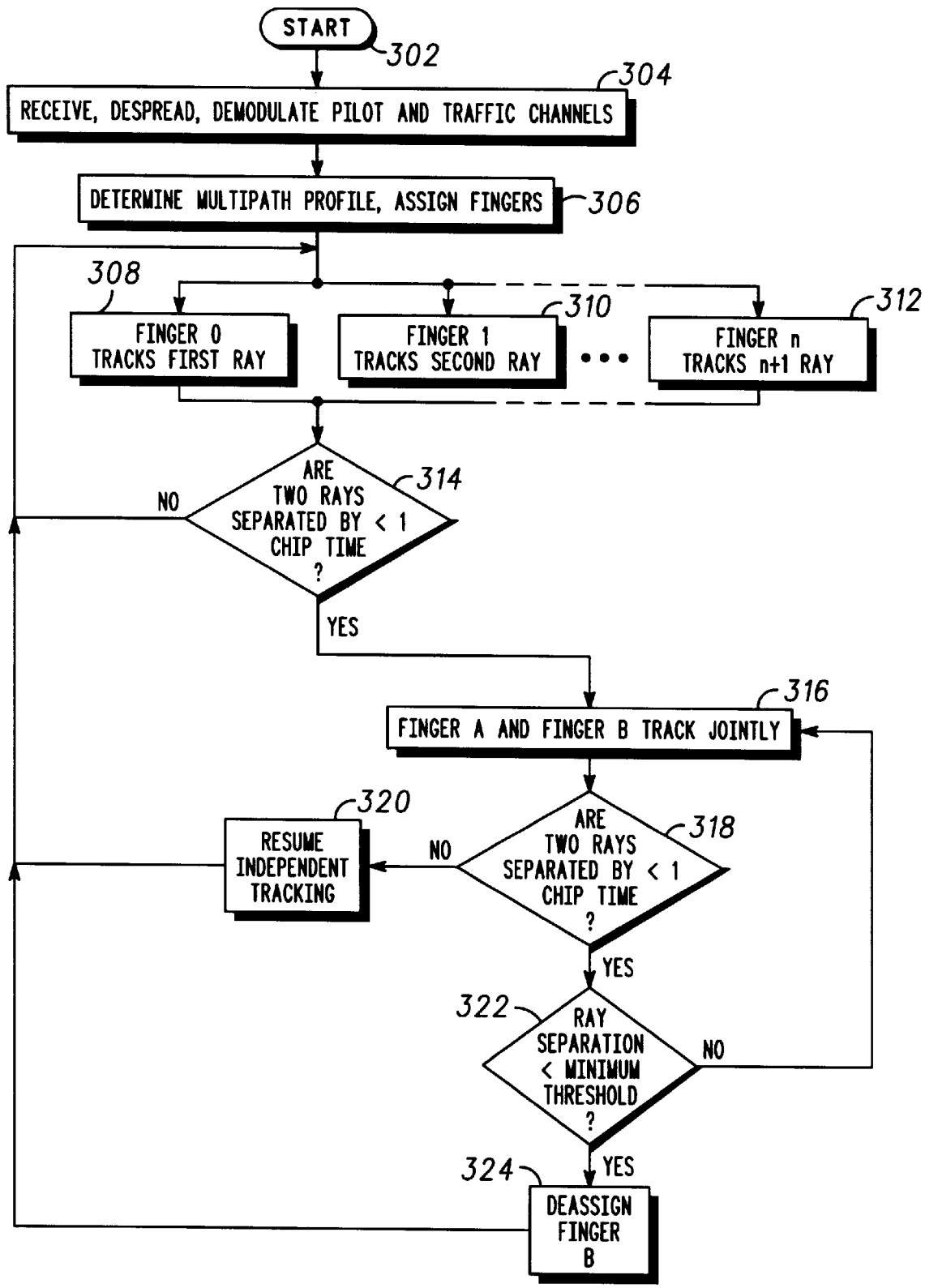
FIG. 3 is a flow diagram illustrating a method for managing finger assignment in a RAKE receiver in accordance with the present invention.

FIG. 3 is a flow diagram illustrating a method for managing finger assignment in a RAKE receiver in accordance with a first embodiment of the present invention. The method begins at step 302. At step 304, the RAKE receiver receives and demodulates traffic channels and a pilot channel. These signals typically include one or more multipath components or rays. At step 306, a multipath profile for the received signals is determined, for example, by a searcher engine associated with the RAKE receiver. In response to the multipath profile, the fingers of the RAKE receiver are assigned to one or more multipath rays. At step 308, step 310 and step 312, the assigned fingers track the timing of their respective rays.

At step 314, it is determined if one ray is separated in time from another ray by less than a predetermined threshold, such as one chip time. If not, no low delay-spread condition exists and control returns to step 308, step 310 and step 312. If a low delay-spread condition does exist, control proceeds to step 316 and a fixed separation time, such as ¾ chip time, is selected to separate the fingers. At step 316, the two fingers begin tracking jointly. Joint tracking may be achieved using a single time tracking loop in the searcher engine, as described above in connection with FIG. 2, by keying the second finger's time position to the first finger's time position, or by any other suitable method.

At step 318, it is determined if the two fingers are still within the predetermined threshold, such as one chip time. If not, joint tracking is no longer necessary and at step 320 independent tracking is resumed. If the two fingers are still within the predetermined threshold, at step 322 it is determined if the two fingers are separated by less than a minimum threshold, such as ¼ chip time. If so, the multipath may not be sufficiently spread to justify assignment of two fingers and at step 324 the second finger is de-assigned. If the two fingers are still separated by more than the minimum threshold, control returns to step 316 and the fingers continue joint tracking.

Thus, according to the first embodiment, the searcher engine detects ray position and controls finger timing to maintain time separation of the fingers to retain the benefits of path diversity. A time tracking loop is used to jointly control two or more fingers of the RAKE receiver to improve performance on low delay-spread channels. When the low delay-spread condition no longer exists, the fingers are returned to independent tracking.

In accordance with a second embodiment, a collision prevention circuit enforces a constraint on assigned fingers to maintain a minimum time separation. Structure and operation of this second embodiment will be described below.

Figure 4:
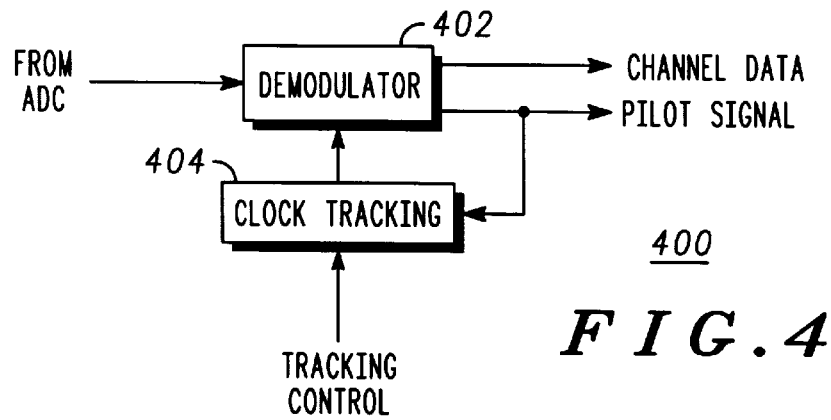
FIG. 4 is a block diagram of a RAKE receiver finger for use in the radiotelephone of FIG. 1.

FIG. 4 is a block diagram of a receiver finger 400 for use in the RAKE receiver 112 of FIG. 1. The receiver finger 400 is one finger of a plurality of fingers of the RAKE receiver 112. Each finger including the receiver finger 400 receives one ray of a multipath signal. The receiver finger 400 is assigned to the ray by the searcher engine 114 (FIG. 1). The receiver finger 400 generally includes a demodulator 402 for demodulating a ray of the multipath signal, the ray having a time position, and a time tracking circuit 404 for controlling a time position of the receiver finger 400 in accordance with the time position of the ray.

The demodulator 402 receives an input signal from the ADC 110 (FIG. 1). This input signal is in the form of a stream of chips at the system chip rate, such as 1.2288 Mega-chips per second in IS95. The demodulator 402 despreads the input signal to extract the pilot signal and channel symbols. The channel symbols are provided to the controller 116 for processing. The demodulator 402 provides information about the channel, such as channel gain and channel phase, to the searcher engine 114 (FIG. 1).

The time tracking circuit 404 tracks timing variation of the multipath ray assigned to the receiver finger 400 and controls the time position of the receiver finger 400 in response. In one embodiment, the time tracking circuit 404 includes a delay-locked loop for detecting a time tracking error and producing a correction signal. Finger timing is referenced to system time in increments of chip times and fractions thereof. The correction signal is provided to the demodulator to vary the time position of the demodulator. The time position of the assigned multipath ray may vary as a result of a change in the length of the path between the base station 102 and the radiotelephone 104 (FIG. 1), for example as the radiotelephone 104 moves, or for other reasons. Since timing of the radiotelephone 104 is synchronized with system timing, even small variations between the time position of the multipath ray and the finger time position can be detected and corrected by the time tracking circuit 404.

Figure 5:
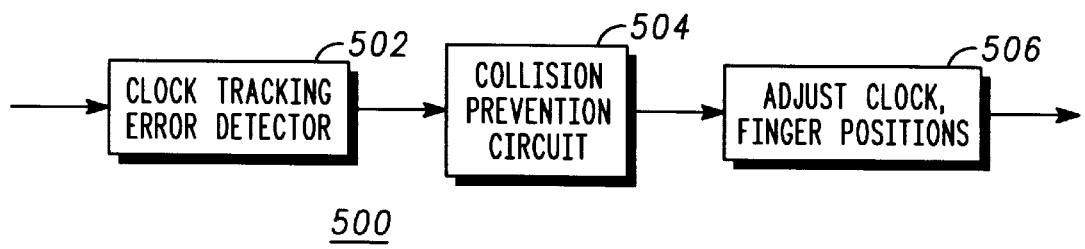
FIG. 5 is a block diagram of a time tracking circuit in accordance with a second embodiment of the present invention.

FIG. 5 shows a block diagram of a time tracking circuit 500 in accordance with the second embodiment of the present invention. The time tracking circuit 500 may be included with each RAKE receiver finger or a single time tracking circuit such as time tracking circuit 500 may be provided for the RAKE receiver, with appropriate connections to each receiver finger. The time tracking circuit 500 includes a clock tracking error detector 502, a collision prevention circuit 504 and a finger timing adjustment circuit 506.

In conjunction with the RAKE receiver, the searcher engine measures the multipath profile and assigns the fingers to the maxima. Each finger has a position associated with it which is a relative time indicator. Each increment of position represents a fraction of the period of the chip clock, which is 1.2288 MHz in an IS-95 system. In the illustrated embodiment, fractions of ⅛ chip are used and other suitable fractions are usable as well. By comparing the time positions of two fingers, the delay or time separation of the two arriving rays is known.

The clock tracking error detector 502 detects errors in the current time position of one or more RAKE receiver fingers and produces a correction signal. The clock tracking error detector 502 includes, for example, a delay-locked loop which compares timing of the received multipath ray at the finger and the current time position and produces an early adjust signal or a late adjust signal as the correction signal. The correction signal is sufficient, when supplied to one or more fingers, to vary the finger timing and align the finger timing more closely with the actual timing of the multipath ray. Thus, the clock tracking error detector 502 determines an adjusted finger position and provides a proposed correction to the collision prevention circuit 504.

The collision prevention circuit 504 receives the correction signal and compares the proposed correction with a time separation threshold. The collision prevention circuit 504 determines a time difference between the adjusted finger position and a second finger time position. If the proposed correction violates the time separation threshold, the collision prevention circuit disallows the proposed correction. This occurs in cases where the proposed correction would cause the RAKE receiver fingers to merge together about a common time position so that the benefits of path diversity are lost. Thus, the collision prevention circuit 504 prevents convergence of the time position of a first receiver circuit, such as the first finger, and the time position of a second receiver circuit, such as the second finer, about a common time position. If no violation occurs, the collision prevention circuit 504 allows the proposed correction.

Allowed corrections are conveyed to the finger timing adjustment circuit 506. In response to an allowed correction, the finger timing adjustment circuit 506 conveys a correction signal to the appropriate finger or fingers to adjust timing of the finger. In this way, timing of the finger is aligned with timing of the received ray while maintaining the minimum specified time separation.

Figure 7:
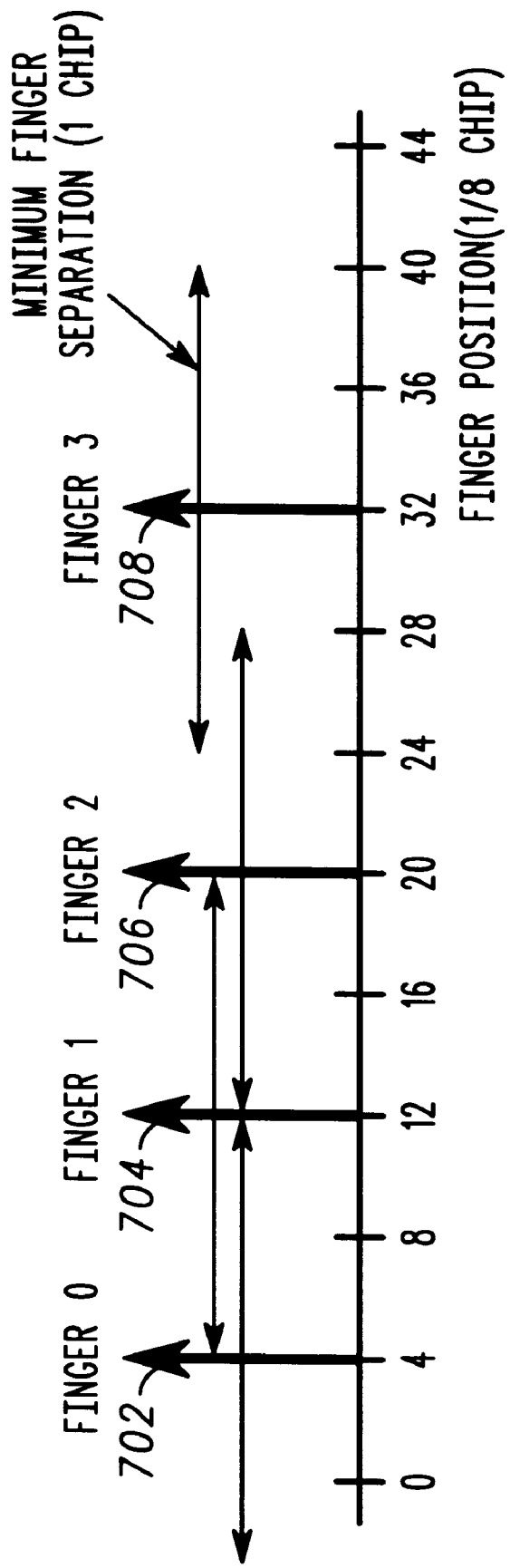
FIG. 7 is a timing diagram illustrating operation of the collision prevention circuit of FIG. 6.

FIG. 7 is a timing diagram 700 illustrating operation of the collision prevention circuit of FIG. 5. FIG. 7 shows a possible assignment of four demodulating RAKE receiver fingers to multipath rays by a searcher engine. In FIG. 7, relative time is shown on the horizontal axis expressed in units of ⅛ chip time. In this scenario, all fingers are constrained to maintain a minimum time separation threshold of one chip by the collision prevention circuit. This limits the clock tracking circuit's ability to make early or late timing adjustments. An early timing adjustment corresponds to moving to the left or decrementing the finger position by 1. A late timing adjustment corresponds to moving to the right or incrementing the finger position by one.

As illustrated in FIG. 7, first finger 702, second finger 704 and third finger 706 are only separated by one chip time while fourth finger 708 has a closest neighbor of third finger 706 at a separation of 1.5 chips. In this case, with a time separation threshold of one chip for all fingers, the collision prevention circuit will only allow the clock tracking loop to make the following adjustments. First finger 702 can only make early adjustments. Second finger 704 can make no adjustments. Third finger 706 can only make late adjustments. Fourth finger 708 can make either early or late adjustments.

The scenario changes if some of the assumptions of FIG. 7 are changed. If the time separation threshold for all chips is changed, the ability of the fingers to make adjustments may change. Similarly, if the time separation thresholds are specified at different values for the individual fingers, the ability of the fingers to make adjustments may change. These thresholds may be individually varied to accommodate current channel conditions and maximize the benefits of path diversity in the RAKE receiver.

FIG. 6 is a block diagram of a collision prevention circuit 600 for a RAKE receiver. The collision prevention circuit 600 may be used in the time tracking circuit 500 of FIG. 5. The collision prevention circuit 600 includes a multiplexer 602, a multiplexer 604, a summer 606, a magnitude circuit 608, a comparator 610, a comparator 612, an AND gate 614, an AND gate 616, and an inverter 618.

Referring again to the time tracking circuit 500 of FIG. 5, if the clock tracking error detector 502 wants to make a timing adjustment, the proposed correction must first be processed by the collision prevention circuit 504. The finger being processed by the collision prevention circuit is referred to as the current finger. Before the current finger's timing can be adjusted, the adjustment must be checked to see if it violates the finger time separation threshold. This is checked by comparing the magnitude of the difference of the current finger's position and non-current finger positions and determining if the difference is less than the threshold. If the difference is greater than the threshold, a late or early timing adjustment is allowed. If the difference is equal to or less than the threshold, the sign of the difference must be examined. If the difference is negative, an early timing adjustment is disallowed. If the difference is positive, a late timing adjustment is disallowed.

Multiplexer 602 and multiplexer 604 each has a number of inputs corresponding to the number of fingers. In the illustrated embodiment, each multiplexer has four inputs to receive a finger position for each respective finger. The inputs are labelled Finger Position 0, Finger Position 1, Finger Position 2 and Finger Position 3 in FIG. 6. Multiplexer 602 has a control input 620 which receives a current finger control signal. Similarly, multiplexer 604 has a control input 622 which receives a non-current finger control signal. In response to these control signals, the collision prevention circuit 600 compares the time position of each of the fingers of the RAKE receiver. Multiplexer 602 provides the current finger position and multiplexer 604 provides the non-current finger positions. By varying the non-current finger control signal, the collision prevention circuit 600 can step through the other fingers and sequentially compare the current finger position with each other finger's position.

The summer 606 receives the current finger position and the non-current finger position and subtracts the two relative positions. The summer output signal is representative of the distance between the two fingers. The summer output signal is conveyed to the magnitude circuit 608 which determines the magnitude of the difference between the current finger position and the other finger position. The magnitude of the difference is conveyed to an input 630 of the comparator 610. The comparator 610 has an input 632 which receives the time separation threshold for the current finger.

The comparator 610 compares the magnitude and the time separation threshold and generates a no adjust signal. The comparator 610 determines if the magnitude of the difference between the finger positions is greater than or equal to the threshold. If the difference is greater than the threshold, a late or early timing adjustment is allowed and the no adjust signal will have a logic 0 value. If the difference is less than or equal to the threshold, the no adjust signal will have a logic 1 value. The no adjust signal is conveyed to the control logic including the AND gate 614 and the AND gate 616.

The summer output signal is also conveyed from the summer 606 to the comparator 612. The comparator 612 determines the sign of the difference between the positions of the current finger and the non-current finger, for example by comparing the difference to 0. If the difference is less than 0, the sign signal produced by the comparator 612 has a logical value of 1. In response, the AND gate 614 produces a no early adjust signal which inhibits an early timing adjustment of the current finger position. If the difference is greater than 0, the sign signal produced by the comparator 612 has a logical value of 0. This value will be inverted by the inverter 618 and the AND gate 616 will allow a no late adjust signal which inhibits a late timing adjustment of the current finger position if both the no adjust and enable signals are logically true.

The AND gate 614 and the AND gate 616 each also includes an Enable input in the illustrated embodiment. The Enable input allows the collision prevention circuit 600 to be selectively disabled. Typically, the circuit would be enabled except for certain cases. One case is when the finger is being slewed from one time position to another under control of the searcher engine. Another case is when the finger's position is being compared with another finger that is disabled. A third case is when the finger's position is being compared with a finger whose clock recovery is being held.

The time shared implementation of the collision prevention circuit 600 illustrated in FIG. 6 may also include a storage device such as a memory to store the no early adjust signal and the no late adjust signal for each finger. The storage device is subsequently addressed to provide the individual no early adjust and no late adjust values to the respective fingers.

In an alternative implementation, the collision prevention circuit 600 includes separate multiplexer and sign and magnitude comparator blocks for each possible combination of fingers. Such an implementation provides faster operation by allowing all finger combinations to be processed simultaneously.

Figure 8:
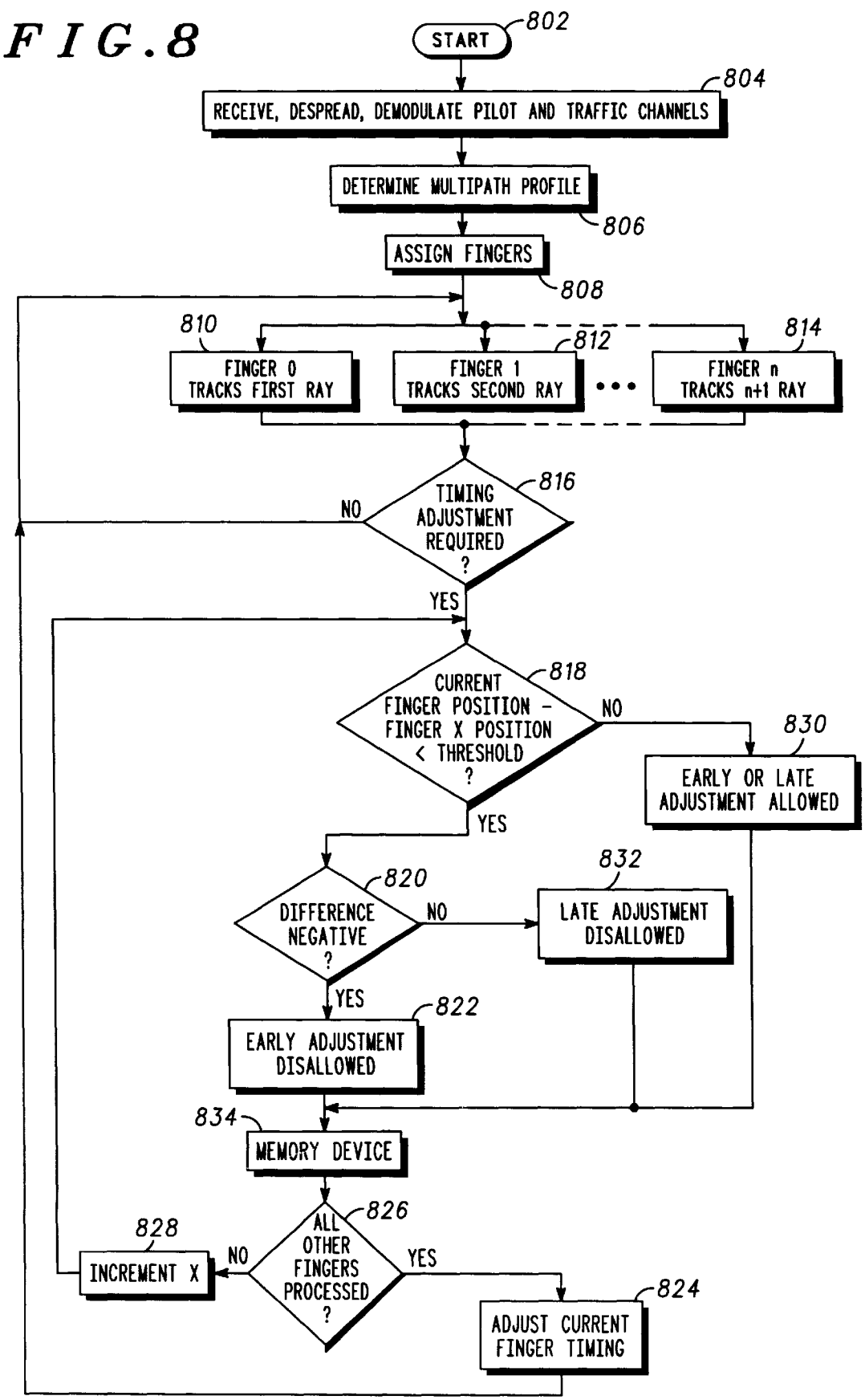
FIG. 8 is a flow diagram illustrating a method for managing finger assignment in a RAKE receiver in accordance with the present invention.

FIG. 8 is a flow diagram illustrating a method for managing finger assignment in a RAKE receiver in accordance with the second embodiment of the present invention. The method begins at step 802.

At step 804, the RAKE receiver receives and demodulates traffic channels and a pilot channel. These signals typically include one or more multipath components or rays. At step 806, a multipath profile for the received signals is determined, for example, by a searcher engine associated with the RAKE receiver. In response to the multipath profile, the fingers of the RAKE receiver are assigned to one or more multipath rays at step 808. At step 810, step 812 and step 814, the assigned fingers track the timing of their respective rays.

At step 816, it is determined if a timing adjustment is required at any of the fingers of the RAKE receiver. If not, control returns to step 810, step 812 and step 814 as the fingers continue tracking the rays. If a timing adjustment is needed, control proceeds to step 818. At step 818, an adjusted finger position is determined. The adjusted finger position is the time position to which timing of the current finger should be adjusted to track variation in timing of the received multipath ray. The adjusted finger position is compared with the position of another finger, designated finger x in FIG. 8. If the difference between the two finger positions is less than a threshold, at step 820 it is determined if the difference is negative. If so, at step 822 early adjustment is disallowed. If not, late adjustment is disallowed. If, at step 818, the difference between the two finger positions is not less than the threshold, at step 830 early or late adjustment is allowed.

At step 834, any disallowed adjustments are stored in a memory device while the current branch is being compared with the other branches. At step 826, it is determined if all other fingers have been processed. If not, at step 828 x is incremented and a new finger is selected as the non-current finger for comparison to the current finger and control returns to step 818. If all other fingers have been processed, at step 824, the appropriate adjustment is made to current finger timing. After step 824, control returns to step 810, step 812 and step 814 as the fingers continue tracking the rays.

As can be seen from the foregoing, the present invention provides method and apparatus for managing finger assignment in a RAKE receiver. The method and apparatus permit the RAKE receiver to combine multipath rays and exploit channel diversity, even when the rays are separated by much less than one chip. In one embodiment, fingers are kept separate in time and track jointly during the low delay-spread condition. In another embodiment, a collision prevention circuit supervises proposed corrections of finger position and disallows corrections that would place the fingers impermissibly close together. Using either embodiment, performance of the RAKE receiver is improved by exploiting path diversity in the channel.

While a particular embodiment of the present invention has been shown and described, modifications may be made. It is therefore intended in the appended claims to cover all such changes and modifications which fall within the true spirit and scope of the invention.

What is claimed is:

1. A method for finger management in a RAKE receiver, the method comprising the steps of:
    at a first finger of the RAKE receiver, receiving a first signal and varying first finger timing according to timing variation of the first signal;
    at a second finger of the RAKE receiver, receiving a second signal and varying second finger timing according to timing variation of the second signal;
    determining a time separation between the first finger timing and the second finger timing; and
    maintaining the time separation greater than a threshold value.

2. A method as recited in claim 1 wherein maintaining the time separation comprises:
    determining an adjusted first finger position;
    determining a time difference between the adjusted first finger position and a second finger position; and
    adjusting the first finger timing to the adjusted first finger position only when the time difference exceeds the threshold value.

3. A method as recited in claim 2 wherein maintaining the time separation comprises determining a magnitude of the time difference and determining the second finger position relative to the adjusted first finger position and wherein the method further comprises the steps of:
    if the magnitude of the time difference is less than the threshold value and the second finger position is earlier than the adjusted finger position, disallowing an early timing adjustment; and
    if the magnitude of the time difference is less than the threshold value and the second finger position occurs later than the adjusted finger position, disallowing a late timing adjustment.

4. A method as recited in claim 1 wherein maintaining the time separation comprises jointly controlling tracking of the first finger timing and second finger timing so that the first finger and the second finger do not converge.

5. A method as recited in claim 4 wherein jointly controlling tracking comprises varying the first finger timing to track the timing variation of the first signal and locking the second finger timing a predetermined time difference from the first finger timing.

6. A method as recited in claim 1 wherein the threshold value comprises substantially one chip interval.

7. A method for finger management in a RAKE receiver, the method comprising the steps of:
    receiving a plurality of signals at the RAKE receiver, the RAKE receiver having more than one finger;
    assigning each finger to one signal of the plurality of signals;
    detecting a low delay-spread condition of the plurality of signals; and
    in response to the low delay-spread condition, controlling a time position of one or more fingers to prevent convergence of two fingers at a common time position, said controlling step including substeps of:
        varying a time position of each finger according to assigned signal time position;
        controlling the time position of a first finger; and
        maintaining the time position of a second finger at a fixed predetermined time difference from a time position of the first finger.

8. A method as recited in claim 7, further comprising the steps of providing a searcher engine for detecting pilot signals for each of the plurality of signals and detecting an assigned signal time position for each of the plurality of signals in response to the pilot signals, the searcher engine providing control signals to each finger to control a time position of each finger in response to the assigned signal time position.

9. A method as recited in claim 7 wherein the method further comprises determining a time difference between the time position of the first finger and the time position of the second finger and comparing the time difference to a threshold.

10. A method as recited in claim 9 wherein the method further comprises the steps of:
    disallowing an early timing adjustment when the time position of the second finger is earlier in time than the time position of the first finger and the time difference is less than the threshold; and
    disallowing a late timing adjustment when the time position of the second finger is later in time than the time position of the first finger and the time difference is less than the threshold.

11. A method for finger management in a RAKE receiver, the method comprising the steps of:
    receiving a plurality of signals at the RAKE receiver, the RAKE receiver having more than one finger;
    assigning a first finger and a second finger to respective signals of the plurality of signals;
    determining a time separation between timing of the first finger and timing of the second finger; and
    maintaining the time separation greater than a threshold value.

12. A method as recited in claim 11 wherein maintaining the time separation comprises the step of disallowing a finger adjustment when the finger adjustment reduces the time separation below the threshold value.

13. A method as recited in claim 11 further comprising the steps of:
    determining a multipath profile of the plurality of signals;
    assigning the first finger to a first signal and the second finger to a second signal according to the multipath profile;

detecting a low delay-spread condition among the first signal and the second signal using the multipath profile; and in response to the low delay-spread condition, maintaining assignment of the first finger and the second finger greater than the threshold value.

14. A receiver for receiving a multipath signal, the multipath signal including at least a first ray having first ray timing and a second ray having second ray timing, the receiver comprising:

a first receiver circuit assignable to receive the first ray, the first receiver circuit including a time tracking circuit for controlling a time position of the first receiver circuit in accordance with the first ray timing;

a second receiver circuit assignable to receive the second ray, the second receiver circuit including a time tracking circuit for controlling a time position of the second receiver circuit in accordance with the second ray timing;

a control circuit which assigns the first receiver circuit to receive the first ray and assigns the second receiver circuit to receive the second ray, the control circuit determines an adjusted first receiver circuit position in response to a variation in the first ray timing; and a collision prevention circuit for preventing convergence of the time position of the first receiver circuit and the time position of the second receiver circuit about a common time position, the collision prevention circuit comprises:

a circuit for determining a time difference between the adjusted first receiver circuit position and the time position of the second receiver circuit; and an adjusting circuit for adjusting the time position of the first receiver circuit to the adjusted first receiver circuit position only when the time difference exceeds a predetermined threshold.

15. A receiver as recited in claim 14 wherein the receiver comprises a RAKE receiver having a plurality of fingers and wherein the first receiver circuit comprises a first finger of the RAKE receiver and the second receiver circuit comprises a second finger of the RAKE receiver.

* * * * *